US006802870B2

(12) United States Patent
Chang et al.

(10) Patent No.: US 6,802,870 B2
(45) Date of Patent: Oct. 12, 2004

(54) METHOD FOR IMPARTING SOIL AND STAIN RESISTANCE TO CARPET

(75) Inventors: John C. Chang, New Brighton, MN (US); Robert F. Deutsch, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/726,901

(22) Filed: Dec. 3, 2003

(65) Prior Publication Data

US 2004/0107508 A1 Jun. 10, 2004

Related U.S. Application Data

(63) Continuation of application No. 09/865,777, filed on May 25, 2001, now Pat. No. 6,736,857.

(51) Int. Cl.[7] .................. D06M 15/643; D06M 15/263; D06M 15/227; C09D 183/04; C08G 77/04

(52) U.S. Cl. .................... 8/115.51; 8/115.56; 427/346; 427/387; 427/389.9; 510/278; 510/340; 510/343; 510/351; 510/356; 510/361; 510/394; 510/434; 510/466; 510/477; 510/492

(58) Field of Search ................................ 510/278, 340, 510/343, 351, 356, 361, 394, 434, 466, 475, 477, 492; 8/115.51, 115.56; 427/346, 387, 389.9

(56) References Cited

U.S. PATENT DOCUMENTS

| | | | | |
|---|---|---|---|---|
| 4,781,844 A | * 11/1988 | Kortmann et al. | ....... | 428/423.1 |
| 6,468,587 B2 | * 10/2002 | Chang et al. | ............... | 427/346 |
| 6,736,857 B2 | * 5/2004 | Chang et al. | .............. | 8/115.51 |

* cited by examiner

*Primary Examiner*—Brian P. Mruk
(74) *Attorney, Agent, or Firm*—Kent S. Kokko

(57) ABSTRACT

A solventless cleaning and treating composition for carpet is described. The composition comprises an aqueous solution of a stainblocking polymer, a silsesquioxane anti-soiling polymer, a surfactant and optionally a sequesting agent or salt.

20 Claims, No Drawings

METHOD FOR IMPARTING SOIL AND STAIN RESISTANCE TO CARPET

This application is a continuation of U.S. Ser. No. 09/865,777, filed May 25, 2001, now U.S. Pat. No. 6,736, 857, the disclosure of which is herein incorporated by reference.

FIELD OF THE INVENTION

This invention relates to new solventless cleaning and treating compositions for carpet. This invention also relates to a method for cleaning and treating carpet with these compositions to impart anti-soiling and stain release properties to the carpet.

BACKGROUND OF THE INVENTION

For many decades, carpet has been the floor covering of choice for improving both the aesthetics and comfort in residential homes and commercial buildings. Though very pleasing in appearance and convenience when new, the carpet over time inevitably is susceptible to staining by foods and beverages and also discoloration due to soil pick-up caused by foot traffic.

To minimize the effect of these assaults, various treatments have been applied to carpet either at the carpet mill or directly after installation (henceforth referred to as "early applied treatments"). Such early applied treatments include (a) fluoroaliphatic compounds and silsesquioxane polymers to provide soil resistance, (b) stainblockers to prevent adherence to, and to facilitate release of, stains from fibers, and (c) various combinations thereof. However, though these early applied treatments may impart good initial protection to carpet, the ability of the treated carpet fibers to resist both soiling and staining gradually diminishes over time due to foot abrasion and soil and stain buildup. At this point, the carpet must be cleaned to restore its initial appearance. Unfortunately, during cycles of carpet cleaning and use, early applied treatments can become ineffective through contamination or may be removed from the carpet, leaving the carpet susceptible to accelerated discoloration from staining and soiling.

In order to maintain satisfactory stain and soil resistance of the carpet after cleaning (i.e., to bolster the resistance of the cleaned carpet to that of the early applied treated carpet), soil and stain resistant agents are normally applied to the cleaned carpet in a separate application step. This post-application is necessitated because of the incompatibility of the anti-soiling chemicals with the cleaning detergent systems and resulting ineffectiveness of such mixtures. For example, anti-soiling chemicals such as perfluoroalkyl group-containing polymers tend to separate out from surfactants thus limiting shelf-life. Additionally, the effectiveness of anti-soiling chemicals and surfactants is related to pH. Anti-soiling chemicals are more effective in an acidic environment while surfactants are more effective in a basic environment thus making it difficult to produce a single composition containing both components while maintaining the desired properties.

Thus, it would be desirable to employ a one-stop cleaning/treating process. But in order to effectively employ such a one-step process, anti-soiling and stainblocking agents must be compatible with cleaning detergents. Additionally, such agents must be quickly exhausted onto the carpet fibers under vacuuming condition, since the time window between contacting the carpet with the cleaning detergents and treating agents and removing such detergents and agents is extremely short. Vacuum application tends to extract the treating agents along with the dirty detergent-containing waste water, resulting in insufficient long-term carpet protection.

Despite these attempts, there continues to be a need an organic solvent-free carpet cleaning system that can simultaneously effectively clean carpet and provide long term anti-soiling and stainblocking protection to the cleaned carpet.

SUMMARY OF THE INVENTION

In one aspect, this invention relates to an aqueous composition having a pH of at least 6 that includes a stainblocking polymer, silsesquioxane anti-soiling polymer, surfactant, and optional sequestering agent, or salt.

In another aspect, this invention relates to a method for cleaning a fibrous polyamide substrate and imparting superior soil and stain resistance properties to the cleaned carpet that includes (a) water extracting the substrate with an aqueous composition of this invention, and (b) vacuum removal of the composition from the cleaned and treated substrate.

A further aspect of the invention relates to a method for cleaning a fibrous polyamide substrate and imparting superior soil and stain resistance properties to the cleaned carpet that includes (a) water extracting the substrate with an aqueous composition of this invention, (b) vacuum removal of the composition from the cleaned and treated substrate; and contacting the substrate with an aqueous composition comprising a stainblocker and a silsesquioxane.

The carpet cleaning and treating compositions of this invention may be used to effectively clean and treat soiled and stained carpet using a one step process, imparting superior anti-soiling and stainblocking properties to the cleaned carpet. This process can be employed with previously installed carpet or, alternatively, can be used in the carpet factory to clean and treat uninstalled, previously untreated carpet. The one step process described in this invention avoids the additional time and labor costs necessitated in a two-step cleaning and treating process as well as reduces the total amount of aqueous cleaner and treatment applied. This reduction in aqueous cleaner amount leads to two advantages: (1) it minimizes damage of the carpet due to water penetration and potential dimensional instability, and (2) it reduces the energy costs in the ovens required to dry the water. Although it is economically more desirable to clean and treat in one step, the carpet cleaning and treating compositions of this invention can be applied onto installed carpets before or after the carpet is cleaned. Additionally, the carpet cleaning and treating compositions of this invention can be applied onto installed carpets cleaned with compositions other than those disclosed in this application. Furthermore, the carpet cleaning and treating compositions of this invention can be applied onto installed carpets that have not been previously imparted with anti-soiling and/or stain release properties.

Cleaning and treating carpet compositions of this invention can be utilized by carpet distributors and professional cleaners as well as by "do-it-yourself" consumers. The cleaning and treating compositions of this invention are shelf stable and can be stored at high concentration without separation.

DETAILED DESCRIPTION OF THE INVENTION

This invention relates to new solventless cleaning and treating compositions for carpet. This invention also relates to a method for cleaning and treating carpet with these compositions to impart anti-soiling and stain release properties to the carpet. In particular, the present invention is directed to aqueous compositions having a pH of at least 6 that include a stainblocking polymer, silsesquioxane anti-soiling polymer, surfactant, and optional sequestering agent, or salt. While the present invention is not so limited, an appreciation of various aspects of the invention will be gained through a discussion of the examples provided below.

The recitation of numerical ranges by endpoints includes all numbers and fractions subsumed within that range (e.g. 1 to 5 includes 1, 1.5, 2, 2.75, 3, 3.80, 4, and 5).

All numbers and fractions thereof are presumed to be modified by the term “about.”

As used herein, “a” includes both the singular and plural.

The general definitions used herein have the following meanings within the scope of the present invention.

The term “alkyl” refers to, unless stated otherwise, straight or branched hydrocarbon radicals, such as methyl, ethyl, propyl, butyl, octyl, isopropyl, tert-butyl, sec-pentyl, and the like. Alkyl groups can either be unsubstituted or substituted with one or more substituents, e.g., halogen, alkoxy, aryl, arylalkyl, aralkoxy and the like. Alkyl groups include, for example, 1 to 25 carbon atoms, 1 to 8 carbon atoms, or 1 to 4 carbon atoms.

The term “halo” refers to, unless stated otherwise, fluoride, chloride, bromide, and iodide radicals.

The term “aryl” refers to, unless stated otherwise, monovalent unsaturated aromatic carbocyclic radicals having a single ring, such as phenyl, or multiple condensed rings, such as naphthyl or anthryl, which can be optionally substituted by substituents such as halogen, alkyl, arylalkyl, alkoxy, aralkoxy, and the like.

The term “alkoxy” refers to, unless stated otherwise, —O-alkyl with alkyl as defined above. Alkoxy groups include, for example, methoxy, ethoxy, propoxy, isopropoxy, and the like.

The term “alkaryl” refers to, unless stated otherwise, an alkyl radical defined as above bonded to an aryl radical as defined above (e.g. alkyl-aryl-).

A wide variety of stainblocking polymers may be used in the compositions of this invention. Included among the useful stainblocking polymers are sulfonated aromatic polymers, polymers that are derived from at least one or more α- and/or β-substituted acrylic acid monomers, and hydrolyzed copolymers of at least one or more ethylenically unsaturated monomers and maleic anhydride. Also useful as stainblocking polymers are blends of at least two or more of these polymers, reaction products of at least two or more of the monomers from which these polymers may be derived, reaction products of at least one or more of the monomers from which the polymers may be derived and at least one or more of the polymers, and materials obtained by polymerizing at least one or more of the monomers in the presence of one or more of the polymers.

Sulfonated aromatic polymers are a preferred class of stainblocking polymers. Desirable examples may comprise a condensation polymer of an aldehyde (e.g., formaldehyde or acetaldehyde) and a sulfonated aromatic compound, or a subsequently sulfonated condensation polymer of an aldehyde and an aromatic compound. Various sulfonated aromatic compounds are available for use in the stainblocking compositions of the invention. However, among the most preferred materials are those which include hydroxyl functionality such as bis(hydroxy phenyl sulfone), hydroxy benzenesulfonic acid, hydroxynaphthalenesulfonic acid, sulfonated 4,4'-dihydroxydiphenylsulfone, and blends thereof. Other useful sulfonated aromatic polymers comprise a copolymer of an ethylenically unsaturated aromatic monomer (e.g., styrene) and a sulfonated ethylenically unsaturated aromatic monomer (e.g., styrene sulfonate).

Another preferred class of stainblocking polymers are polymers derived from at least one or more α- and/or β-substituted acrylic acid monomers. These monomers have the general structure $HR^1C{=}C(R)COOX$, wherein R and $R^1$ are independently selected from hydrogen, organic radicals and halogens, and X is independently selected from hydrogen, organic radicals and cations. Particularly preferred examples of the resulting polymers are acrylic polymers; i.e., polyacrylic acid, copolymers of acrylic acid and one or more other monomers that are copolymerizable with acrylic acid, and blends of polyacrylic acid and one or more acrylic acid copolymers. Even more preferred, however, are methacrylic polymers which includes polymethacrylic acid, copolymers of methacrylic acid and one or more other monomers that are copolymerizable with methacrylic acid, and blends of polymethacrylic acid and one or more methacrylic acid copolymers.

A third preferred class of stainblocking polymers includes hydrolyzed copolymers of at least one or more ethylenically unsaturated monomers and maleic anhydride. The ethylenically unsaturated monomers can be alpha-olefin type monomers (e.g. 1-alkenes), alkyl vinyl ethers or, more preferably, aromatic monomers such as styrene.

Quite useful stainblocking polymers may be obtained by blending together two or more polymers selected from among the different general classes of polymers described above, reacting together at least two or more monomers from which the different general classes of polymers are derived, reaction products of at least one or more of the monomers from which the polymers may be derived and at least one or more of the polymers, or by polymerizing at least one or more of the monomers in the presence of one or more of the polymers.

For example, one or more α- and/or β-substituted acrylic acid monomers may be polymerized together and, subsequent to the polymerization, blended with a sulfonated aromatic polymer. Alternatively, the α- and/or β-substituted acrylic acid monomers can be polymerized in the presence of a sulfonated aromatic polymer.

In another example, a hydrolyzed copolymer of ethylenically unsaturated monomer and maleic anhydride may be combined with a sulfonated aromatic polymer, and, optionally, a polymer derived from at least one or more α- and/or β-substituted acrylic acid monomers.

By “monomer” is meant a polymerizable single unit (typically of low molecular weight) that provides repeating units in the ultimate polymer, as well as partially reacted materials that can still participate in a polymerization reaction so as to provide repeating units in the ultimate polymer. The expression “at least” recognizes, as explained below, that monomers in addition to those mentioned may participate in the polymerization.

Sulfonated aromatic polymers useful in the invention may be obtained by condensation polymerizing an aldehyde with a sulfonated aromatic compound, the resulting polymer sometimes being referred to herein as either a sulfonated aromatic condensation polymer or as a condensation polymer. The resulting condensation polymer should contain a significant number of sulfonate groups. It is also preferred that the resulting condensation polymer be substantially soluble in water to simplify handling and application of the stainblocking composition to a substrate at normal temperatures (room temperature to 100° C., where "room temperature" refers to a temperature of 20 to 25° C.).

Any aldehyde that can be condensation polymerized with a sulfonated aromatic compound may be used in the invention. Suitable examples of such aldehydes include acetaldehyde, benzaldehyde, furfuraldehyde, and, most preferably, formaldehyde. Suitable sulfonated aromatic compounds for forming the condensation polymer include monomers such as benzene sulfonic acid (which, in general, may contain various combinations of alkyl, hydroxy and alkoxy substituents), toluene sulfonic acid, xylene sulfonic acid (e.g., 2,4-dimethyl benzene sulfonic acid), phenyl 4-sulfonic acid, cumene sulfonic acid, dodecylbenzene sulfonic acid, sulfonated diphenyl ether, benzaldehyde sulfonic acid, aminobenzene sulfonic acid, alkoxybenzenesulfonic acid, benzophenone sulfonic acid, sulfonated derivatives of styrene, dodecyl diphenyloxide disulfonic acid, sulfonated derivatives of naphthalene (e.g., naphthalene sulfonic acid), which derivatives may generally contain various combinations of alkyl, hydroxy and alkoxy substituents such as, alkylnaphthalene sulfonic acid (e.g., methylnaphthalene sulfonic acid) and alkoxynaphthalene sulfonic acid.

Including hydroxyl functionality in the sulfonated aromatic compound may enhance its solubility in water. Hydroxyl functionality may be introduced into the sulfonated aromatic compound (so as to form a sulfonated hydroxyaromatic compound) by either sulfonating a phenolic compound, or by polymerizing the aldehyde and the sulfonated aromatic compound with a hydroxyaromatic material (preferably a phenolic compound). Phenolic compounds useful in either approach include phenol, halogenated phenol (e.g., chlorophenol or trifluoromethylphenol), naphthol, dihydroxydiphenylsulfide, resorcinol, catechol, hydroxyarylcarboxylic acid (e.g., salicylic acid), hydroxyphenylphenyl ether, phenylphenol, alkylphenol (e.g., nonylphenol or cresol), dihydroxydiphenylsulfone, and bis (hydroxyphenyl)alkane (e.g., 2,2-bis(hydroxyphenyl) propane or 2,2,-bis(hydroxyphenyl)hexafluoropropane). Resulting materials include sulfoalkylated phenol, (e.g., sulfomethylated dihydroxydiphenyl sulfone). Particularly preferred sulfonated hydroxyaromatic compounds include bis(hydroxyphenyl)sulfone, hydroxybenzenesulfonic acid, hydroxynapthalenesulfonic acid, and sulfonated 4,4'-dihydroxydiphenylsulfone.

Enhanced solubility in water may also be obtained by providing the sulfonated aromatic compound as a salt based on, for example, sodium, potassium, or ammonium, such as sodium xylene sulfonate, ammonium xylene sulfonate, sodium toluene sulfonate, sodium cumene sulfonate, ammonium cumene sulfonate, potassium toluene sulfonate, potassium cumene sulfonate, and potassium xylene sulfonate.

Particularly preferred condensation polymers consist essentially of repeating units of the formula

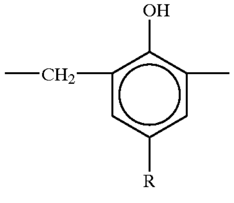

where R is the same or different in each unit, and is either hydrogen or a radical selected from the group consisting of —$SO_3X$,

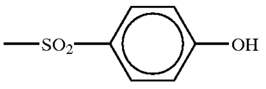

and

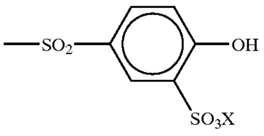

where X is hydrogen or a cation such as sodium or potassium, provided that the resulting polymer contains a sufficient number of sulfonate groups (typically at least 30%). Even more preferred are condensation polymers having these structures and which are water soluble, have at least 40% of the repeating units containing an —$SO_3X$ radial, and have at least 40% of the repeating units containing the group —$SO_2$—.

Sulfonated aromatic condensation polymers useful in the invention are described in U.S. Pat. No. 4,680,212 (Blyth et al.), U.S. Pat. No. 4,875,901 (Payet et al.), U.S. Pat. No. 4,940,757 (Moss, III et al.), U.S. Pat. No. 5,061,763 (Moss, III et al.), U.S. Pat. No. 5,074,883 (Wang), and U.S. Pat. No. 5,098,774 (Chang).

Sulfonated aromatic condensation polymers useful in the invention can be prepared by methods known to those skilled in the art. Sulfonation of phenolic compounds is described in, for example, *Sulfonated and Related Reactions*, E. E. Gilbert, Interscience Publishers, 1965. Methods of preparing condensation polymers of sulfonated aromatic compounds with formaldehyde are described in U.S. Pat. No. 1,901,536 (Schafer), U.S. Pat. No. 1,972,754 (Biedernann), U.S. Pat. No. 1,988,985 (Schafer), U.S. Pat. No. 2,112,361 (Fischer), U.S. Pat. No. 2,171,806 (Russell, et al.), U.S. Pat. No. 4,680,212 (Blyth et al.), U.S. Pat. No. 4,940,757 (Moss, III et al.), U.S. Pat. No. 5,061,763 (Moss, III et al.), and Phenolic Resins, A. Knopf et al., Springer-Verlag, 1985.

In general, an aromatic compound such as phenol, naphthalene or naphthol is sulfonated, for example by reacting it with a sulfonating compound such as sulfuric acid, chlorosulfonic acid or alkaline sulfite so as to form a sulfonated aromatic compound. The sulfonated aromatic compound is then condensation polymerized with formaldehyde or other aldehyde, typically under acidic conditions. Mixtures of different sulfonated aromatic compounds can also be polymerized. Typically, one mole of sulfonated aromatic compound is reacted with 0.5 to 1.2 mole of aldehyde. The sulfonated aromatic condensation polymer can be subsequently reacted with a base (e.g., sodium hydroxide, potassium hydroxide, or ammonium hydroxide) so as to form a sulfonic acid salt. Currently marketed condensation polymers are typically sold as a sodium sulfonate salt.

Alternatively, a sulfonated aromatic condensation polymer may be prepared by reacting an unsulfonated hydroxy aromatic compound (e.g., a phenolic compound such as phenol, naphthol, etc.) with an aldehyde such as formaldehyde and then sulfonating the resulting condensation polymer by treatment with fuming sulfuric acid.

Examples of useful, commercially available sulfonated aromatic condensation polymers include Erional™ NW (Ciba-Geigy Limited; containing a naphthalene sulfonic acid polymer with formaldehyde and 4,4'-dihydroxydiphenylsulfone), Erional™ PA (polymer of phenol sulfonic acid, formaldehyde, and 4,4' dihydroxydiphenyl sulfone from Ciba-Geigy), 3M™ brand stain release concentrate FX-369™ (3M Co.), Tamol™ SN (Rohm & Haas Co.), Mesitol™ NBS, Bayprotect CL or CSD™ (Bayer AG), Nylofixan™ P (containing a formaldehyde condensation copolymer of 4,4'-dihydroxydiphenylsulfone and 2,4-dimethylbenzenesulfonic acid, manufactured by Sandoz Corp.), and Intratex™ N (Crompton & Knowles Corp.). The sulfonated aromatic polymers are typically purchased commercially as a 30 to 40% solids aqueous solution that can contain other compounds, including aromatic sulfonic acids and glycols.

The effectiveness of a sulfonated aromatic condensation polymer in imparting stain resistance to a substrate may be improved by providing the condensation polymer in the form of a divalent metal salt. These salts are water soluble and are substantially free of sulfonic acid moieties (i.e., —$SO_3H$ groups); that is, they typically contain less than 1 mole percent sulfonic acid moieties. The salt form of the polymer may be obtained by reacting the condensation polymer with a divalent metal oxide or hydroxide, or the divalent metal salt of a weak acid (e.g., carbonic acid, boric acid, or a carboxylic acid) so as to form an aqueous solution having a pH of at least 3. In another approach, a sulfonated aromatic compound that is used to prepare the condensation polymer may first be converted to a salt (by using a divalent metal oxide or hydroxide, or a divalent metal salt of a weak acid) before reaction with an aldehyde to yield the salt form of the polymer. Suitable divalent metal oxides or hydroxides include oxides and hydroxides of calcium, magnesium and zinc. Divalent metal salts of weak acids include carbonates, bicarbonates, acetates, formates and borates of calcium, magnesium and zinc. Even further improvements in stain resistance may be achieved by adding small amounts (less than 0.1% SOF, more preferably less than 0.05% SOF) of a divalent metal salt (such as those discussed in the additives section below) to the salt form of the polymer. (% SOF refers to the % solids based on the weight of the fibrous substrate.) Such techniques are described in U.S. Pat. No. 5,098,774 (Chang).

Sulfonated aromatic condensation polymers may discolor with time and assume a yellow tint that can be undesirable, especially depending on the color of the substrate to which the stainblocking composition is applied. Thus, a blue substrate may acquire a greenish cast. One technique for reducing the tendency to change color is to remove color formers inherent in the stainblocking polymer. This can be accomplished by dissolving the condensation polymer in aqueous base so as to form a solution having a pH of 8–12, acidifying the aqueous solution to a pH of a 2 to 7.5, heating the acidified material to a temperature of 50 to 65° C. so as to cause phase separation, removing materials which remain water-soluble after acidification and heating (e.g., by filtering, centrifuging or decanting), and dissolving the resultant water-insoluble material in aqueous base to a final pH of at least 8, using heat as necessary to effect dissolution. Strong bases (e.g., sodium hydroxide, potassium hydroxide, lithium hydroxide) may be used. Virtually any acid is suitable, e.g. glacial acetic acid, dilute acetic acid, hydrochloric acid, sulfuric acid, oxalic acid, citric acid, or sulfamic acid. Such techniques are described in U.S. Pat. No. 4,833,009 (Marshall).

Another technique for reducing the tendency to change color is to acylate or etherify a portion of the free hydroxyl groups in the condensation polymer. However, acylating or etherifying the free hydroxyl groups can reduce the stainblocking characteristics of the condensation polymer. Thus, the portion of the free hydroxyl groups that are so treated should strike a balance between a reduced tendency to yellow and effective stainblocking. Useful acylating agents include acetic anhydride and ethylchloroformate (conversion of 50% to 80% of the phenolic hydroxyl groups). Chloroacetic acid is a useful etherifying agent (conversion of 40% to 60% of the phenolic hydroxyl groups). The acylated and etherified products can be prepared by dissolving the condensation polymer in an aqueous medium having a pH of 7 or above, preferably 10 or 11 to 13 or 14 (the actual pH depending on the acylating or etherifying agent), and at a temperature that favors acylation or etherification. The water-insoluble phase can be separated from the unwanted water solution by filtering, centrifuging, decanting, etc., and then redissolved in a hydroxyl-functional material, such as ethylene glycol, 1,3-propylene glycol, or 1,3-butylene glycol. Such techniques are described in U.S. Pat. No. 4,963,409 (Liss et al.).

In another embodiment, sulfonated aromatic polymers useful in the invention as stainblocking polymers may comprise a copolymer of: (a) one or more ethylenically unsaturated aromatic monomers; and (b) one or more sulfonated ethylenically unsaturated aromatic monomers. Specific examples of ethylenically unsaturated aromatic monomers (a) include styrene, a-methylstyrene, 4-methyl styrene, stilbene, 4-acetoxystilbene, eugenol, isoeugenol, 4-allylphenol, safrole, and mixtures of these materials. Preferably, the sulfonated monomers are water soluble, which can be facilitated by providing the monomer in the form of a salt, for example, salts of alkali metals (e.g., sodium) and ammonium salts. A variety of sulfonated monomers (b) may be used including those which result from sulfonating the ortho and/or para positions of the monomers used to provide ethylenically unsaturated aromatic monomer (a). Particular examples include sodium p-styrene sulfonate, sodium vinyl p-toluene sulfonate, ammonium p-styrene sulfonate.

In the sulfonated aromatic copolymers of this embodiment, the ratio of units derived from monomer (a) to the units derived from monomer (b) is preferably 0.1 to 10:1, more preferably 0.9:1. Materials of this type are described in International Patent Publication No. WO 92/07131 (E. I. du Pont de Nemours and Company). The sulfonated aromatic copolymers can be conveniently prepared by a variety of free radical-initiated polymerization reactions using, for example benzoyl peroxide or 2,2'-azobis(2-methylbutyronitrile).

A second class of stainblocking polymers useful in the invention are polymers of at least one or more (α- and/or β-substituted) acrylic acid monomers, these materials sometimes being referred to herein as (α- and/or β-substituted) acrylic acid polymers. The use of the parenthetical expression "alpha-and/or beta-substituted" indicates that substitution of the α- and β-positions of the acrylic acid monomer is independently optional. That is, both positions may be substituted, neither position may be substituted, or either one of the two positions may be substituted without the other-position being substituted. Thus, (α- and/or β-substituted) acrylic acid monomers that are useful in preparing the polymers have the general structure $HR^1C{=}C(R)COOX$, wherein R and $R^1$ are independently selected (i.e., they may be the same or they may be different) from hydrogen, organic radicals or halogen, and X is hydrogen, an organic radical, or a cation. Organic radicals that may be used to provide R and $R^1$ include aliphatic hydrocarbons (more preferably, alkyl moieties having 1 to 20, most preferably 1 to 4 carbon atoms such as methyl, ethyl, propyl and butyl), which, optionally, may be sulfonated or halogenated (for example, by chlorine or fluorine); and aromatic hydrocarbons (more preferably, a phenyl group), which, optionally, may be sulfonated, halogenated (for example, by chlorine or fluorine), hydroxylated (e.g., phenol or naphthol), or combinations thereof (e.g., sulfonated phenol or sulfonated naphthol). Halogens that may be used for R and $R^1$ include chlorine and fluorine.

Organic radicals that may be used to provide the X group include both aliphatic moieties (which may be linear, branched or cyclic, and preferably containing 1 to 10 carbon atoms), or aromatic moieties, any of which may, optionally, be halogenated, sulfonated, carboxylated, hydroxylated or ethoxylated, including cationic (e.g., sodium, potassium, ammonium, and quaternary amine) salts of these materials. Cations that may be used to provide X include sodium, potassium, ammonium, and quaternary amine.

Preferred monomers are defined by structures in which $R^1$ is hydrogen, R is an alkyl group having 1 to 4 carbon atoms, phenyl, phenol, sulfonated phenol, naphthol, chlorine, or fluorine, and X is hydrogen, an alkyl group of 1 to 10 carbon atoms, sodium, potassium or ammonium. The most preferred monomer is methacrylic acid ($R^1$ and X are hydrogen, R is methyl).

The (α- and/or β-substituted) acrylic acid polymers are preferably sufficiently water-soluble or water dispersible that uniform application and penetration of the polymer into the substrate surface can be achieved at normal application temperatures (room temperature to 100° C.). However, excessive water solubility may reduce the treated substrate's resistance to staining by acid colorants, as well as the effectiveness of the stainblocking compositions after cleaning the substrate.

The glass transition temperature of the (α- and/or β-substituted) acrylic acid polymers can be as low as 35° C. although higher glass transition temperatures are preferred. When polymers having high glass transition temperatures (e.g., 90° C. or higher) are used, an additional benefit of improved soil resistance may be obtained.

The weight average molecular weight and the number average molecular weight of the (α- and/or α-substituted) acrylic acid polymers should be selected so as to provide satisfactory stain resistance, water solubility, viscosity, and ability to be handled in conventional stainblocking polymer manufacturing and application processes. Preferably, the lower 90 weight percent of the polymer has a weight average molecular weight of 3,000 to 250,000, and a number average molecular weight of 500 to 50,000, more preferably 800 to 10,000. Generally, a larger proportion of water-soluble comonomer is preferred for high molecular weight polymers and a larger proportion of water-insoluble comonomer is preferred for low molecular weight polymers.

In some instances, however, higher molecular weight materials may be useful. For example, a water soluble copolymer of acrylic acid and methacrylic acid may have a weight average molecular weight of 80,000 to 500,000, more preferably 100,000 to 350,000, and most preferably 130,000 to 200,000. In the higher weight average molecular weight copolymers, the acrylic acid preferably comprises 1 to 20 weight percent, more preferably 5 to 15 weight percent, while the methacrylic acid correspondingly provides 99 to 80 weight percent, more preferably, 95 to 85 weight percent, the sum of the acrylic acid and methacrylic acid equaling 100 weight percent.

Included within the class of (α- and/or β-substituted) acrylic acid polymers are acrylic polymers; i.e., polyacrylic acid, copolymers of acrylic acid and one or more other monomers that are copolymerizable with acrylic acid, and blends of polyacrylic acid and one or more acrylic acid copolymers. These can be produced using well-known techniques for polymerizing ethylenically unsaturated monomers. Also included within the class of (α- and/or β-substituted) acrylic acid polymers, and most preferred, are methacrylic polymers; i.e., polymethacrylic acid, copolymers of methacrylic acid and one or more other monomers that are copolymerizable with methacrylic acid, and blends of polymethacrylic acid and one or more methacrylic acid copolymers. The methacrylic polymers useful in the invention can also be prepared using methods well-known in the art for polymerization of ethylenically unsaturated monomers.

Monomers useful for copolymerization with either the acrylic acid or the methacrylic acid have ethylenic unsaturation. Such monomers include monocarboxylic acids, polycarboxylic acids, and anhydrides of the mono- and polycarboxylic acids; substituted and unsubstituted esters and amides of carboxylic acids and anhydrides; nitriles; vinyl monomers; vinylidene monomers; monoolefinic and polyolefinic monomers; and heterocyclic monomers. Specific representative monomers include acrylic acid, itaconic acid, citraconic acid, aconitic acid, maleic acid, maleic anhydride, fumaric acid, crotonic acid, cinnamic acid, oleic acid, palmitic acid, vinyl sulfonic acid, vinyl phosphonic acid, and substituted or unsubstituted alkyl and cycloalkyl esters of these acids, the alkyl or cycloalkyl groups having 1 to 18 carbon atoms such as methyl, ethyl, butyl, 2-ethylhexyl, octadecyl, 2-sulfoethyl, acetoxyethyl, cyanoethyl, hydroxyethyl, b-carboxyethyl and hydroxypropyl groups. Also included are amides of the foregoing acids, such as acrylamide, methacrylamide, methylolacrylamide, 1,1-dimethylsulfoethylacrylamide, acrylonitrile, and methacrylonitrile. Various substituted and unsubstituted aromatic and aliphatic vinyl monomers may also be used; for example, styrene, a-methylstyrene, p-hydroxystyrene, chlorostyrene, sulfostyrene, vinyl alcohol, N-vinyl pyrrolidone, vinyl acetate, vinyl chloride, vinyl ethers, vinyl sulfides, vinyl toluene, butadiene, isoprene, chloroprene, ethylene, isobutylene, and vinylidene chloride. Also useful are various sulfated natural oils such as sulfated castor oil, sulfated sperm oil, sulfated soybean oil, and sulfonated dehydrated castor oil. Particularly useful monomers include ethyl acrylate, butyl acrylate, itaconic acid, styrene, sodium sulfostyrene, and sulfated castor oil, either alone or in combination. The methacrylic polymers may be polymerized in the presence of chain transfer agents or other polymers which may incorporate into the methacrylic polymer during polymerization.

In the methacrylic polymers, the methacrylic acid preferably provides 20 to 100 weight percent, more preferably 60 to 90 weight percent, of the polymer. The optimum proportion of methacrylic acid in the polymer depends on the comonomer(s) used, the molecular weight of the copolymer, and the pH at which the material is applied. When water-insoluble comonomers such as ethyl acrylate are copolymerized with methacrylic acid, they may comprise up to 40 weight percent of the methacrylic polymer. When water-soluble comonomers such as acrylic acid or sulfoethyl acrylate are copolymerized with methacrylic acid, the water soluble comonomers preferably comprise no more than 30 weight percent of the methacrylic polymer and preferably the methacrylic polymer also comprises up to 50 weight percent water-insoluble monomer.

Commercially available acrylic polymers useful as stainblocking polymers include Acrysol™ (available from Rohm and Haas Company) and Carbopol™ from B. F. Goodrich. Commercially available methacrylic polymers generally useful in the present invention include the Leukotan™ family of materials such as Leukotan™ 970, Leukotan™ 1027, Leukotan™ 1028, and Leukotan™ QR 1083, available from Rohm and Haas Company.

Polymers of (α- and/or β-substituted) acrylic acid monomers useful in the stainblocking compositions of the invention are described in U.S. Pat. No. 4,937,123 (Chang et al.), U.S. Pat. No. 5,074,883 (Wang), and U.S. Pat. No. 5,212,272 (Sargent et al.).

A third class of stainblocking polymers useful in the invention are hydrolyzed polymers of maleic anhydride and at least one or more ethylenically unsaturated monomers. The unsaturated monomer may be an alpha-olefin monomer or an aromatic monomer, although the latter is preferred. A variety of linear and branched chain alpha-olefins may be used including alkyl vinyl ethers. Particularly useful alpha-olefins are 1-alkenes containing 4 to 12 carbon atoms, such as isobutylene, 1-butene, 1-hexene, 1-octene, 1-decene, and 1-dodecene, with isobutylene and 1-octene being preferred, and with 1-octene being most preferred. A portion of the alpha-olefins can be replaced by one or more other monomers, e.g., up to 50 wt. % of alkyl ($C_1$-4) acrylates, alkyl ($C_{1-4}$) methacrylates, vinyl sulfides, N-vinyl pyrrolidone, acrylonitrile, acrylamide, as well as mixture of the same.

A variety of ethylenically unsaturated aromatic monomers may be used to prepare the hydrolyzed polymers. The ethylenically unsaturated aromatic monomers may be represented by the general formula:

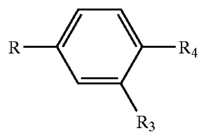

wherein R is $R^1$—CH═C($R^2$)— or $CH_2$═CH—$CH_2$—; $R^1$ is H—, $CH_3$— or phenyl $R^2$ is H— or $CH_3$—; $R^3$ is H— or $CH_3O$—; $R^4$ is H—, $CH_3$—, or acetyl and $R^3$ plus $R^4$ is —$CH_2$—O—$CH_2$—O—$CH_2$—.

Specific examples of ethylenically unsaturated aromatic monomers include free radically polymerizable materials such as styrene, α-methylstyrene, 4-methyl styrene, stilbene, 4-acetoxystilbene (used to prepare a hydrolyzed polymer from maleic anhydride and 4-hydroxy-stilbene), eugenol, isoeugenol, 4-allylphenol, safrole, mixtures of these materials, and the like. Styrene is most preferred. The utility of some of these materials may be improved by increasing the amount of polymerization initiator or acylating or etherifying the phenolic hydroxy groups.

In the hydrolyzed polymers, the ratio of units derived from ethylenically unsaturated monomer to units derived from maleic anhydride is 0.4:1 to 1.3:1 when the unsaturated monomer is an alpha-olefin, and is 1:1 to 2:1 when using an unsaturated aromatic monomer. In any event, a ratio of 1:1 is most preferred.

Hydrolyzed polymers suitable for use in the invention may be prepared by hydrolyzing ethylenically unsaturated maleic anhydride polymers. Alkali metal hydroxides (such as potassium hydroxide, lithium hydroxide and, most often, sodium hydroxide, as well as blends of these) are suitable hydrolyzing agents. Hydrolysis can be effected in the presence of more than or less than a molar amount of the alkali metal hydroxide. The presence of an alcohol in the hydrolysis mixture should be avoided.

Hydrolyzed polymers of at least one or more alpha-olefin monomers and maleic anhydride useful in the stainblocking compositions of the invention are described in U.S. Pat. No. 5,460,887 (Pechhold). Hydrolyzed polymers of at least one or more ethylenically unsaturated aromatic monomers and maleic anhydride useful in the stainblocking compositions of the invention are described in U.S. Pat. No. 5,001,004 (Fitzgerald et al.).

Useful stainblocking polymers may be obtained: (1) by blending together at least two or more polymers selected from among the different general classes of polymers described above; (2) by reacting together at least two or more monomers from which the different general classes of polymers are derived; (3) as the reaction product of at least one or more of the monomers from which the polymers may be derived and at least one or more of the polymers; or (4) by polymerizing at least one or more of the monomers in the presence of one or more of the polymers.

For example, one or more (α- and/or β-substituted) acrylic acid monomers may be polymerized together and, subsequent to the polymerization, blended with a sulfonated aromatic polymer. This permits both the carboxyl functionality from the (α- and/or β-substituted) acrylic acid polymer and the sulfonate functionality from the sulfonated aromatic polymer to contribute to the stainblocking properties of the composition. Particularly useful examples of such blends comprise a sulfonated aromatic condensation polymer (e.g., the condensation polymerization product of an aldehyde such as formaldehyde or acetaldehyde, a hydroxyaromatic compound such as bis(hydroxyphenyl)sulfone, phenol or napthol, and phenylsulfonic acid), and methacrylic polymer (e.g., polymethacrylic acid or a copolymer of methacrylic acid and or more of the following monomers: ethyl acrylate, butyl acrylate, itaconic acid, styrene, sodium sulfostyrene, sulfated castor oil, and acrylic acid).

The amounts of the sulfonated aromatic polymer and the (α- and/or β-substituted) acrylic acid polymer used should be sufficient to provide the desired degree of stain resistance to the substrate. Generally, when the substrate is nylon 6,6, lower application levels can be used than when the substrate is nylon 6 or wool. When the substrate is yarn heat-set under moist conditions (e.g., in an autoclave), generally higher application levels are required than when the yarn is heat-set under substantially dry conditions. Preferably, the amount of sulfonated aromatic polymer is at least 0.1% SOF, more preferably at least 0.2% SOF, most preferably at least 0.4% SOF when treating nylon 6,6 carpet fiber. Generally, amounts of sulfonated aromatic polymer in excess of 2% SOF provide little added benefit. Preferably the amount of (α- and/or β-substituted) acrylic acid polymer is at least 0.1% SOF, more preferably at least 0.2% SOF, most preferably at least 0.4% SOF when treating nylon 6,6 carpet fiber. Generally amounts of (α- and/or β-substituted) acrylic acid polymer in excess of 2% SOF provide little added benefit. Preferably, the amount of sulfonated aromatic polymer used is at least 0.2% SOF, more preferably at least 0.4% SOF, based on the weight of the fiber when treating nylon 6 carpet fiber. Preferably, the amount of (α- and/or β-substituted) acrylic acid polymer is at least 0.2 more, % SOF, preferably at least 0.4% SOF when treating nylon 6 carpet fiber.

Alternatively, the (α- and/or β-substituted) acrylic acid monomer may be polymerized in the presence of the sulfonated aromatic polymer. Examples of such compositions comprise an α—substituted acrylic acid monomer (e.g., having the structure $H_2C$═C(R)$CO_2$H, wherein R is an alkyl group having 1 to 4 carbon atoms, phenyl, phenol, sulfonated phenol, naphthol, chlorine or fluorine) polymerized in the presence of a sulfonated aromatic condensation polymer (e.g., the condensation polymerization product of an aldehyde such as formaldehyde or acetaldehyde, a hydroxy aromatic compound such as bis(hydroxyphenyl) sulfone, phenol or napthol, and phenylsulfonic acid). Such techniques are described in U.S. Pat. No. 4,940,757 (Moss, III et al.).

A free radical polymerization initiator is added to initiate polymerization of the (α- and/or β-substituted) acrylic acid monomer in the presence of the sulfonated aromatic polymer. Useful initiators include persulfates (e.g., potassium persulfate, ammonium persulfate, or sodium persulfate), peroxides (e.g., sodium peroxide, hydrogen peroxide, benzoyl peroxide, acetyl peroxide, lauryl peroxide, cumyl peroxide, t-butyl peroxide, or t-butyl hydroperoxide), azo compounds (e.g., azo-bis-isobutryonitrile), and hydrochloride salts of azo compounds.

In another embodiment, a stainblocking polymer may be prepared by reacting a sulfonated hydroxy aromatic compound with isocyanate, carboxylic acid, carboxylic acid anhydride, carboxylic acid chloride, or other carboxylic acid precursor, any of which may be saturated or unsaturated. The ester formed by this reaction may then be reacted by itself or with an (α- and/or β-substituted) acrylic acid, and a free radical polymerization initiator, either in the presence of or in the absence of another sulfonated aromatic polymer. Alternatively, the ester formed from the first reaction may be homopolymerized or copolymerized with an aromatic compound in an aldehyde condensation reaction. The resulting product can be further reacted, either by itself or with an (α- and/or β-substituted) acrylic acid in the presence of a free radical polymerization initiator. Useful free-radical polymerization initiators include persulfates (e.g., ammonium persulfate, sodium persulfate, or potassium persulfate), peroxides (e.g., sodium peroxide, hydrogen peroxide, benzoyl peroxide, acetyl peroxide, lauryl peroxide, cumyl peroxide, t-butyl peroxide, or t-butyl hydroperoxide), an azo compound (e.g., azo-bis-isobutyronitrile), and peracetate (e.g., t-butyl peracetate). Such techniques are described in U.S. Pat. No. 5,310,828 (Williams et al.).

Other useful combinations include hydrolyzed polymers of ethylenically unsaturated monomer and maleic anhydride blended with sulfonated aromatic polymers and/or polymers of (α- and/or β-substituted) acrylic acid. For example, a part of the maleic anhydride (up to 30 weight %) can be replaced by acrylic or methacrylic acid. In another embodiment, a part (preferably 1–75% by weight) of the maleic anhydride can be replaced by maleimide, N-alkyl ($C_{1-4}$) maleimides, N-phenyl-maleimide, fumaric acid, itaconic acid, citraconic acid, aconitic acid, crotonic acid, cinnamic acid, alkyl ($C_1$-18) esters of the foregoing acids, cycloalkyl ($C_2$-8) esters of the foregoing acids, sulfated castor oil, or the like.

Particularly preferred blends comprise 95 to 30 weight % of hydrolyzed polymer of ethylenically unsaturated aromatic monomer and maleic anhydride (more preferably, 85 to 40 weight %), and 5 to 70 weight % of a sulfonated aromatic condensation polymer, e.g., a sulfonated phenol-formaldehyde condensation polymer (more preferably, 15 to 60 weight %), wherein the sum of these two components is 100 weight %. Such combinations are described in U.S. Pat. No. 4,833,839 (Fitzgerald et al.).

Suitable silsesquioxane polymers for use in this invention are those described in U.S. patent application Ser. No. 09/607,667, which is incorporated herein by reference. The silsesquioxane materials can be any of the types described in U.S. Pat. No. 4,781,844 (Kortmann, et al), U.S. Pat. No. 4,351,736 (Steinberger et al.), U.S. Pat. No. 5,073,442 (Knowlton et al.) or U.S. Pat. No. 3,493,424 (Mohrlok et al.) each of which are incorporated herein by reference. These silsesquioxane polymers are of the formula R—$SiO_{3/2}$ or R—Si(OR')$_3$ alone or together with silanes of the formula Si(OR')$_4$ and/or $R_2$—Si(OR')$_2$ wherein R represents a substituted or unsubstituted hydrocarbon radical having 1 to 7 carbon atoms, substituents of which may be halogen atoms and mercapto and epoxy groups. R' represents an alkyl radical with 1 to 4 carbon atoms. Preferred silsesquioxane polymers are those that are neutral or anionic.

The silsesquioxane polymers may be prepared by adding silanes to a mixture of water, a buffer, a surface active agent and optionally an organic solvent, while agitating the mixture under acidic or basic conditions. It is preferable to add the quantity of silane uniformly and slowly in order to achieve a narrow particle size of 200 to 500 Angstroms. The exact amount of silane that can be added depends on the substituent R and whether an anionic or cationic surface active agent is used.

Silsesquioxane copolymers in which the units can be present in block or random distribution are formed by the simultaneous hydrolysis of the silanes. The preferred amount of silane of the formula Si(OR')$_4$ added is 2 to 50 percent, relative to the total weight of the silanes employed, preferably 3 to 20 percent.

The following silanes are useful in preparing the silsesquioxane polymers of the present invention: methyltrimethoxysilane, methyltriethoxysilane, methyltriisopropoxyoxysilane, ethyltrimethoxysilane, ethyltriethoxysilane, propyltrimethoxysilane, isobutyltrimethoxysilane, isobutyltriethoxysilane, 2-ethylbutyltriethoxysilane, tetraethoxysilane, and 2-ethylbutoxytriethoxysilane.

The surfactants, or surface active agents, useful as foaming agents in the cleaning/treating solutions of this invention are synthetic or natural organic compounds or materials capable of foaming water. Those surfactants which are preferred are those sometimes characterized as capable of forming "strongly foaming solutions", e.g., see "Foams", J. J. Bikerman, published by Springer-Verlag, New York, Inc., pages 108–132 (1973). The usefulness of a surfactant, and its amount, for purposes of this invention, can be determined by the foam volume or height and its resistance to collapse. Generally, the applicable surfactant(s) and amount thereof useful in producing the foams of this invention will yield a foam volume (or height) at least one-and-a-half, and preferable at least twice, that of the foamable aqueous solution, a simple test for this purpose being the shaking by hand of the test solution in a suitable closed container. For example, 100 g of such solution is vigorously shaken 25 times in a 480 mL, or larger, closed glass jar or a calibrated vessel, and the height of the resulting foam vis-a-vis the height of the solution before shaking is measured, the ratio of foam height to solution height being the expansion value.

The hydrocarbon surfactants useful in this invention can be anionic, nonionic, cationic, or amphoteric, and compatible mixtures thereof. Classes of surfactants which are useful include: soaps or the salts of fatty acids, such as those having the general formula RCOOM, where R is a fatty aliphatic group and M is an alkali metal, e.g., sodium oleate, laurate, palmitate, or stearate; fatty alkyl sulfates, such as those of the general formula $ROSO_2OM$, e.g., sodium decyl, dodecyl, tetradecyl, hexadecyl, heptadecyl, or octadecyl sulfate; $RSO_3M$, e.g., sodium decyl, dodecyl, tetradecyl, hexadecyl, heptadecyl, or octadecyl sulfonate; salts of alkarylsulfonic acids, such as those of the general formula $RC_6H_4SO_3M$, e.g., sodium octylbenzene sulfonate or sodium xylene sulfonate; ethylene oxide adducts, such as those of the general formula $R(CH_2CH_2O)_nH$ where R is a fatty aliphatic radical, e.g., where R is $C_{10}H_{21}O$ to $C_{18}H_{37}O$ and n is 10 to 60; those of the general formula $R(OCH_2CH_2)_nOSO_3$ M, where R is a $C_{10}$ to $C_{18}$ alkyl group, n is 1 to 3, and M is sodium; and salts of dialkyl sulfosuccinic acids, e.g., sodium dioctyl sulfosuccinate. Also see Encyclopedia of Chemical Technology, Kirk-Othmer, 3rd Ed., Vol. 22, pages 347–387, John Wiley & Sons (1983) for other surfactants useful in this invention.

Useful surfactants include anionic surfactants alone or in combination with other surfactants such as, for example, nonionic surfactants. Any anionic surfactant can be used in the composition, so long as the anionic surfactant is compatible with the other elements of the composition, and provides detergency desired to clean a soiled carpet. Suitable anionic surfactant or surfactants can contain one or two hydrophobic groups and one or two water-solubilizing anionic groups.

The hydrophobic group(s) should be large enough to make the surfactant sufficiently surface active, i.e., the total number of carbon atoms in all hydrophobic groups can preferably be at least 8. Examples of suitable hydrophobic groups include straight and branched octyl, decyl, lauryl (i.e., mostly dodecyl), myristyl (i.e., mostly tetradecyl), cetyl (i.e., mostly hexadecyl) and stearyl (i.e., mostly octadecyl); dodecylbenzyl, naphthyl, xylyl and diphenyl. Heteroatom-containing moieties may be present in the hydrophobic group, e.g., ester, amide and ether. When more than one hydrophobic group is present, the length of the chain may be relatively shorter (e.g., two n-butyl groups).

The water-solubilizing anionic group can preferably be sufficiently polar to effectively solubilize the surfactant in water to allow formation of micelles. Suitable water-solubilizing anionic groups include sulfonate, sulfate, and carboxylate. The positive counterion for the anionic group can be an alkali metal ion (e.g., $Na^+$, $K^+$ or $Li^+$), an alkaline earth metal ion (e.g., $Mg^{++}$ or $Ca^{++}$), or an ammonium ion (e.g., $NH_4^+$ or triethanolammonium). Optionally, the water-solubilizing anionic group can also contain a polyoxyethylene group of 1–15 monomeric units located between the hydrophobic group and the charged ionic group to form an ether sulfate, ether sulfonate or ether carboxylate group.

The total amount of surfactant present in a concentrate composition generally is in an amount in the range from 0.1% to 10% by weight, preferably from 0.5% to 6%, by weight and more preferably from 1% to 3% by weight. When used in the form of an aqueous use dilution, the surfactant can generally be present in an amount of 0.002% to 0.156% by weight, preferably 0.008% to 0.094% by weight, and more preferably 0.016% to 0.047% by weight.

Examples of suitable anionic surfactants include sodium xylene sulfonate, sodium lauryl sulfate, sodium myristyl sulfate, sodium lauryl ether (2) sulfate (i.e., $C_{12}H_{25}(OCH_2CH_2)_2OSO_3^-Na^+$), sodium decyl sulfate, ammonium myristyl ether sulfate, sodium nonylphenol polyglycol ether (15) sulfate, sodium $C_{16}$–$C_{18}$ α-olefin sulfonate, sodium dodecylbenzenesulfonate, sodium naphthyl sulfonate, sodium dihexyl sulfosuccinate, sodium laurate, sodium stearate, sodium ether (5) stearate, potassium ricinoleate (potassium 12-hydroxy-9-octadecanoate), sodium myristoyl sarcosine and sodium N-methyl-N-oleyl taurate. The preferred surfactant is sodium xylene sulfonate. Such anionic surfactants are commercially available from many suppliers, many of whom are listed in the McCutcheon's Emulsifiers & Detergents directory, North America or International Editions (1996).

The anionic surfactant can generally be present in a concentrate composition in an amount in the range from 0.25% to 10% by weight, preferably from 0.5% to 6%, by weight and more preferably from 0.75% to 1% by weight. When used in the form of an aqueous use dilution, the surfactant can generally be present in an amount of 0.004% to 0.156% by weight, preferably 0.008% to 0.094% by weight, and more preferably 0.012% to 0.016% by weight.

The nonionic surfactants of the present invention include those having a hydrophobic/lipophilic balance (HLB) value (also called HLB number) of at least 18. HLB values measure the polarity of a nonionic surfactant, with least hydrophilic/most lipophilic surfactants (i.e., those having a low level of ethoxylation) having a low HLB value and most hydrophilic/least lipophilic surfactants (i.e., those having a high level of ethoxylation) having a high HLB value. For a more detailed description of HLB values, see Nonionic Surfactants: Physical Chemistry, vol. 23, ed. M. J. Schick, pp.438–456 (1987). Examples of suitable nonionic surfactants include nonylphenol polyethylene glycol ether Tergitol™ 15-S-40 (Dow Chemical, Midland, Mich.), which has an HLB value of 18.

The nonionic surfactant can generally be present in a concentrate composition in an amount in the range from 0.25% to 10% by weight, preferably from 0.5% to 6%, by weight and more preferably from 1% to 2% by weight. When used in the form of an aqueous use dilution, the surfactant can generally be present in an amount of 0.004% to 0.156% by weight, preferably 0.008% to 0.094% by weight, and more preferably 0.016% to 0.031% by weight.

The composition may optionally contain a sequestering agent to chelate hardness ions such as calcium, magnesium, iron, manganese and the like that might be present in an aqueous use dilution water and detract from the cleaning performance of the composition. The sequestering agent can be organic or inorganic. Organic sequestering agents include a broad range of materials that can complex hardness ions. These include EDTA and its salts, citric acid and its salts, boric acid and its salts, nitrilotriacetic acid and its salts, polyelectrolytes such as polyacrylic acid and its copolymers, polymaleic acid and its copolymers, and so on. Inorganic sequestering agents include condensed phosphates, particularly those of the formula $M—(PO_3M)_nOM$ wherein M is an alkali metal, n is a number ranging from 1 to 60, typically less than 3 for non-cyclic phosphates. Examples of such phosphates include alkali metal orthophosphates such as sodium or potassium orthophosphate and alkali metal condensed phosphates (i.e., polyphosphates) such as sodium or potassium pyrophosphate, sodium tripolyphosphate, sodium hexametaphosphate and the like. A preferred sequestering agent is sodium tripolyphosphate, due to its sequestration and soil suspension properties. The sequestering agent can generally be present in an amount in the range from 2% to 12% by weight of a concentrate composition, preferably from 3% to 9% by weight and more preferably from 5% to 7% by weight. The sequestering agent can typically be present in an aqueous use dilution in an amount in the range from 0.047% to 0.188% by weight, preferably from 0.031% to 0.141% by weight, and more preferably from 0.078% to 0.109% by weight.

The composition may optionally contain salts for improving the deposition of the stainblocking polymer onto the carpet. Useful salts include metal salts and ammonium salts. Suitable salts for use in the present invention include divalent metal salts such as $MgSO_4$, $MgCl_2$, $CaCl_2$, $Ca(CH_3COO)_2$, $SrCl_2$, $BaCl_2$, $ZnCl_2$, $ZnSO_4$, $FeSO_4$ and $CuSO_4$; monovalent metal salts such as LiCl, NaCl, NaBr, NaI, KCl, CsCl, $Li_2SO_4$ and $Na_2SO_4$; polyvalent metal salts such as $AlCl_3$ and aluminum citrate; and ammonium salts such as $NH_4Cl$, $(NH_4)_2SO_4$, and $(CH_3)_4NCl$. Divalent metal salts are generally preferred, with magnesium salts (e.g., $MgSO_4$) being especially preferred, although good results can also be obtained under certain conditions through the use of monovalent metal salts or polyvalent metal salts or ammonium salts. The salt is most effective when applied at levels of 0.1 to 3%, preferably 0.5 to 3%, solids on carpet in the cleaning and treating composition.

The composition may optionally contain base and/or buffer to adjust the pH of the composition to its optimal working range. While the optimal pH for the treatment compositions may vary depending on the choice of materials, optimal results are generally obtained when the composition has an initial pH, or adjusted pH, of at least 6. Preferably, the composition has an initial pH, or adjusted pH, in the range of 6 to 8. If the pH of the cleaning/treating composition is kept below 6, the composition does not remain homogeneous due to precipitation of the silsesquioxane polymer. When the pH of the composition is above 8, the stainblocking performance continually diminishes with increasing pH.

Typically when formulating the compositions of this invention, an upward pH adjustment to near neutrality is required due to the high inherent acidity of most stainblocking polymers. To make this upward pH adjustment, small amounts of strong bases such as sodium or ammonium hydroxide can be used. However, to better control the pH of the composition over an extended period of time, incorporation of larger amounts of a buffer can be employed. Many inorganic and organic salts are useful as buffers for stabilizing the pH of the composition in the range of 6–8, including: mixtures of disodium hydrogen phosphate and potassium dihydrogen phosphate, sodium bicarbonate, disodium tetraborate, mixtures of tris (hydroxymethylaminomethane) (TRIS) and TRIS hydrochloride, ammonium acetate, and histidyl-glycine. Buffers can be used at a molar concentration range of 0.001 molar (M) to 1 M in the concentrate form of the composition, or from 0.000015 M to 0.015 M in the aqueous use dilution form of the composition. (For further information on buffers, see CRC Handbook of Chemistry and Physics, 2000–2001, $81^{st}$ Ed., Ed. D. R. Lide, pp. 8–35 to 8–40.)

The composition may optionally contain other ingredients, such as anti-foaming agents, fragrances, preservatives, and the like. If used, these added ingredients are typically present in relatively small amounts, such as 0.05% to 0.20% by weight of the composition in concentrate form, or from 0.0008% to 0.0031% by weight of the aqueous use dilution.

Although it is preferred and possible that the composition contain no organic solvent, it may be necessary that a very small amount of a compatible organic solvent be contained in the composition, e.g., because it has been included as part of the commercially available ingredients used (e.g., as a solvent or remnant of production), or, in order to dissolve one or more other ingredients within the composition. Generally, this amount will preferably be below 1% by weight, more preferably less than 0.5% by weight, and more preferably less than 0.1% by weight of the concentrate composition, so that in effect the composition essentially contains no organic solvent.

The composition may be prepared as a concentrate that contains a concentrated solution of the components described above, or as an "aqueous use dilution" wherein the above concentrate is combined with a sufficient amount of water to provide a solution that can be used with standard carpet cleaning equipment. In general, the aqueous use dilution can be prepared by diluting 1 to 2 parts by weight of the concentrate with from 99 to 98 parts by weight water.

The compositions of the invention can be prepared by combining the ingredients, heated or unheated, with stirring until a uniform mixture is obtained.

This invention can be employed to clean carpets constructed from a variety of fibers, including polyamide (e.g., nylon 6 and nylon 6,6), wool, polyolefin (e.g., polypropylene), polyester, acrylic, and blends thereof. Preferably, the fiber is a polyamide or a polyamide blend fiber.

In the method of the invention, a cleaning and treating composition of this invention can be applied to a carpet using cleaning methods known in the carpet cleaning art. A preferred method includes a water extraction step, wherein the temperature of the cleaning and treating composition during hot water extraction, e.g., the composition after aqueous use dilution, is preferably at least 50° C., and wherein the composition can be delivered to a carpet by employing a high pressure pump system. Following the water extraction step, the spent composition, i.e., the soiled aqueous use composition resulting after exposure to the carpet, can be subsequently removed from the carpet by employing a first vacuum removal step with a wet vacuum system. The 1st vacuum removal step can occur within 60 minutes, preferably within 10 minutes, more preferably within 1 minute, and most preferably within 10 seconds from the onset of the water extraction step. It is desirable to minimize this exposure time to facilitate the removal of the cleaning and treating composition from the contacted carpet fibers. One or more additional steps of hot water extraction followed by vacuum removal can be employed to further clean and treat the carpet. Removal of cleaning and treating composition residuals can be optimized by employing a water rinsing step followed by a second vacuum removal step, both performed within 60 minutes, preferably within 10 minutes, more preferably within 1 minute, and most preferably within 10 seconds after the completion of the first vacuum removal step. Optimum cleaning and treating of the carpet can result by employing this sequence of a water extraction step, a first vacuum removal step, a water rinsing step and a second vacuum removal step, though this invention can be also practiced by employing only the water extraction step and first vacuum removal step. After the water extraction step, vacuum removal step, water rinsing step, and second vacuum removal step, or a series or combination thereof, the carpet is allowed to dry. After the soiled carpet is cleaned with a cleaning and treating composition of this invention, the resulting cleaned carpet continues to exhibit at least a portion of, and usually a large extent of, the original stainblocking and soil resistance properties imparted by the original carpet treatment applied at the time of manufacture.

The stainblocking and soil resistance properties of the substrate can be further enhanced by the use of an additional step where an aqueous composition including a stainblocker and a silsesquioxane, as defined above, is applied to the cleaned and treated substrate. Preferably, this additional step is performed on the cleaned and treated substrate prior to drying.

The invention is further described by reference to the following examples, which are understood to be illustrative and non-limiting of the invention. Unless otherwise specified, all percentages shown in the examples and test methods which follow are percentages by weight.

EXAMPLES

Glossary

Polymer A—a polymethylsilsesquioxane anti-soiling polymer prepared as follows.

To a 3-L three-necked flask equipped with heater, stirrer and condenser was added 1106.0 g of deionized water and 14.0 g of linear alkylsulfonic acid (available from Alfa Aesar, Johnson Matthey, Ward Hill, Mass.; believed to be dodecylbenzenesulfonic acid). The resulting mixture was heated to 60° C. with stirring until homogeneous, and 280 g of methyltrimethoxysilane ($CH_3Si(OCH_3)_3$, available from Sigma Aldrich Chemical Co., Milwaukee, Wis.) was slowly added to the mixture over a 4 hour period. The hydrolysis reaction was allowed to continue overnight at 60° C. with stirring, and the resulting reaction product was filtered. Then sufficient 20% aqueous $NH_4OH$ was added to the filtrate to adjust the pH of the filtrate to 8.5. The resulting neutralized mixture was then stripped using a rotovap set at 50° C. to produce 530 g of distillate consisting primarily of methanol with a small amount of water. The anionic emulsion of silsesquioxane that had formed was 10.3% solids and had an average particle diameter of approximately 30 nm, as measured using the Multi Angle Sizing option on a Zeta Plus zeta potential analyzer (available from Brookhaven Instruments Corp., Holtsville, N.Y.).

Polymer B—a methacrylic acid-containing stainblocking polymer prepared as follows.

To a 1-L reaction vessel equipped with reflux condenser, mechanical stirrer and thermometer were charged 7.0 g of sulfated castor oil (SCO) solution (70% solids) and 515.0 g of deionized water. The resulting solution was heated to 95° C., and thereto was added dropwise a solution containing 198.0 g of methacrylic acid (MAA), 45.2 g of butyl acrylate (BA), 21.6 g of ammonium persulfate initiator and 50 g deionized water, with stirring continuing over a period of 2 hours. The reaction mixture was stirred for an additional 3 hours at 90° C., then the mixture was cooled to 50° C. The resultant copolymer solution was neutralized to a pH of 4 by the addition of 25.2 g of 20% aqueous NaOH to give a methacrylic acid polymer solution containing 33% solids and having a monomer weight ratio of 80/18/2 MAA/BA/SCO.

FC-661—3M™ Stain Release Concentrate FX-661, a stainblocking polymer blend for carpet comprised of sulfonated phenolic and acrylic resins, available as a 29% solids aqueous emulsion from 3M Company, St. Paul, Minn.

SR-500—a stainblocking polymer comprising a hydrolyzed maleic anhydride resin, available as a 29% solids aqueous solution from duPont de Nemours, Wilmington, Del.

15-S-40—TERGITOL™ 15-S-40, a non-ionic hydrocarbon surfactant available from Union Carbide Corp., South Charleston, W. Va.

SXS—Sodium xylene sulfonate, an anionic hydrocarbon surfactant available from Sigma Aldrich Chemical Co.

STPP—sodium tripolyphosphate, available from Sigma Aldrich Chemical Co.

PM-1661—3M™ PM-1661 Protective Chemical, a 25% solids aqueous dispersion of a water-repellent carpet protector, available from 3M Company.

TRANSITION III—TRANSITION III™ nylon 6,6 carpet, "Blue Moon" color, having a face weight of 36 oz/yd$^2$ (1.2 kg/m$^2$), available from Burlington Industries, Greensboro, N.C.

QUEEN—SOLUTIA™ nylon 6,6 carpet, "Carolina Blue" color, having a face weight of 42 oz/yd$^2$ (1.4 kg/m$^2$), available from Queen Carpet Co., Dalton, Ga.

Test Methods

Simulated Flex-Nip Application Procedure—The Simulated Flex-Nip Application Procedure described below was used to simulate the flex-nip operations used by carpet mills to apply stainblocking composition to carpet.

In this test, a carpet sample measuring approximately 12 inches by 12 inches (30 cm×30 cm), typically weighing approximately 125 g, is immersed in deionized water at 100° C. temperature until dripping wet. Water is extracted from the wet sample by spinning in a Bock Centrifugal Extractor (available from Bock Engineered Products, Inc., Toledo, Ohio) until the sample is damp. After extraction, the carpet sample is allowed to cool to near room temperature, and the aqueous treating composition is applied by placing the carpet sample, carpet fiber side down, in a glass tray containing the treating composition. The treating composition contains sufficient treating material(s) to give the desired percent solids on fiber (% SOF) and is prepared by dissolving or dispersing the treating materials in deionized water and adjusting the pH of the resulting aqueous treating solution to desired value using 10% aqueous sulfamic acid. The weight of the treating solution present in the glass tray is approximately 4 times the weight of the carpet sample (e.g., 400 g of treating solution is used for a 100 g carpet sample). The carpet sample absorbs the entire volume of treating solution over a 1 to 2 minute period to give a percent wet pickup of approximately 350%.

Then the wet treated carpet sample is steamed for 2 minutes at atmospheric pressure, at a temperature of 90–100° C. and 100% relative humidity in an enclosed steam chamber. Following steaming, the carpet is spun to dampness using the centrifugal extractor and then is cured and dried in a forced air oven at 120° C. for 25 minutes before testing.

Carpet Cleaning Procedure—Cleaning/extraction of carpet samples was performed after application/curing step and before performance testing. The cleaning solutions were normally heated to around 50° C. before and during application.

To extract carpet samples, a BISSELL™ POWERSTEAMER™ ProHeat™ Plus steam cleaner (available from Bissell Homecare, Inc., Grand Rapids, Mich.) was employed using the following procedure:

Step 1: Heated cleaning/treating solution is applied in one slow forward and back pass followed by two forward and back vacuum passes.

Step 2: The carpet sample is rotated 90 degrees and additional heated cleaning solution is applied in one slow forward and back pass followed by two forward and back vacuum passes.

Step 3: The carpet sample is again rotated 90 degrees and heated water solution is applied in one slow forward and back pass followed by three forward and back vacuum passes.

Step 4: The carpet samples are allowed to dry in the lab hood over night under ambient conditions.

Step 5: In some cases, one or two further extractions were performed on carpet samples when the experiment was designed to have more than one extraction (i.e., Steps 1–4 were repeated once or twice).

Spray Re-treating Procedure—The aqueous treating solution is applied to the carpet sample via spraying to 15% by weight wet pickup, using a laboratory-sized sprayer. The wet sprayed carpet is then dried at 120° C. in a forced air oven until dry (typically for 10–20 minutes). The application rate of the treatment (in % SOF or solids on fiber) is controlled by varying the conveyor speed. Unless otherwise noted, in all cases FC-661 stainblocking polymer and Polymer A anti-soiling polymer were co-applied at 0.5% SOF and 0.1% SOF, respectively, during the spray re-treating procedure.

"Walk-On" Soiling Test—The relative soiling potential of each treatment was determined by challenging both treated and untreated (control) carpet samples under defined "walk-on" soiling test conditions and comparing their relative soiling levels. The test is conducted by mounting treated and untreated carpet squares on particle board, placing the samples on the floor of one of two chosen commercial locations, and allowing the samples to be soiled by approximately 9,000 foot-traffics (unless otherwise noted). The amount of foot traffic in each of these areas is monitored, and the position of each sample within a given location is changed daily using a pattern designed to minimize the effects of position and orientation upon soiling.

Following the soil challenge period, the carpet samples are removed and the amount of soil present on a given sample is determined using colorometric measurements, making the assumption that the amount of soil on a given sample is directly proportional to the difference in color between the unsoiled sample and the corresponding sample after soiling. The three CIE L*a*b* color coordinates of the unsoiled and subsequently soiled samples are measured using a 310 CHROMA METER™ color analyzer with a D65 illumination source. The color difference value, ΔE, is calculated using the equation shown below:

$$\Delta E=[(\Delta L^*)^2+(\Delta a^*)^2+(\Delta b^*)^2]^{1/2}$$

where:

ΔL*=L*soiled−L*unsoiled

Δa*=a*soiled−a*unsoiled

Δb*=b*soiled−b*unsoiled

ΔE values calculated from these colorometric measurements have been shown to be qualitatively in agreement with values from older, visual evaluations such as the soiling evaluation suggested by the AATCC, and have the additional advantages of higher precision, being unaffected by evaluation environment or subjective operator differences. The reported ΔE value reported for each carpet sample is calculated as an average of between five and seven replicates. A larger ΔE value indicates greater soiling.

Stain Resistance Test—Stain resistance was determined using the following test procedure.

A treated 10 cm×10 cm carpet sample is stained for 24 hours by contacting the carpet sample in an aqueous solution of 0.007% (wt) of Red Dye FD&C #40 in deionized water adjusted to a pH of 2.8–3.2 with aqueous acid. The treated and stained carpet sample is rinsed under a stream of water until the wash water runs clear. The wet carpet sample is then extracted to dampness using a Bock Centrifugal Extractor and is air-dried overnight at room temperature.

The degree of staining of the carpet sample is determined numerically by using a 310 CHROMA METER™ compact tristimulus color analyzer (available from Minolta, The color analyzer measures red stain color autochromatically on the red-green color coordinate as a "delta a" (Δa) value as compared to the color of an unstained and untreated carpet sample. Measurements reported in the tables below are given to one place following the decimal point and represent the average of 3 measurements, unless stated otherwise. A larger Δa value indicates a greater amount of staining from the red dye. Δa values typically vary from 0 (no staining) to 50 (severe staining).

Cleaning/Treating Solutions

Several series of cleaning/treating concentrate solutions were formulated for later evaluation as carpet cleaners and protectors. The pH of all concentrate solutions evaluated was around 6. In some cases, no pH adjustment was necessary as the measured pH after component blending was very close to 6. However, in most cases after component blending, the pH of the concentrate solution required adjustment to around 6, which was accomplished using aqueous sodium hydroxide.

The first series of cleaning/treating solutions, CTS-A, CTS-B and CTS-C, was based on an aqueous experimental lab cleaning solution (CS-1) containing sodium xylene sulfonate, TERGITOL™ 15-S-40 and sodium tripolyphosphate. The composition of each solution evaluated in this series is shown in TABLE 1, depicted as % solids of each anti-soiling polymer and stainblocking polymer added to the lab cleaning solution. The remainder of each composition is water or incidental solvents included with the various components.

TABLE 1

| | Percent in cleaning/treating formulation: | | | |
|---|---|---|---|---|
| Component: | CS-1 | CTS-A | CTS-B | CTS-C |
| Hydrocarbon surfactant: | | | | |
| SXS | 0.88 | 0.88 | 0.88 | 0.88 |
| 15-S-40 | 1.71 | 1.71 | 1.71 | 1.71 |
| Sequestering agent: | | | | |
| STPP | 2.44 | 2.44 | 2.44 | 2.44 |
| Anti-soiling polymer: | (none) | | | |
| Polymer A | | 2.44 | 2.44 | 2.44 |
| Stainblocking polymer: | (none) | | | |
| Polymer B | | 2.44 | | |
| FC-661 | | | 2.44 | |
| SR-500 | | | | 2.44 |

The second series of cleaning/treating solutions, CTS-D through CTS-H, was based on a commercially available carpet cleaning solution (CS-2), BISSELL™ Fiber Cleansing Formula Carpet Detergent (available from Bissell, Inc., Grand Rapids, Mich.), which is believed to contain proprietary hydrocarbon surfactants and sequestering agents. The composition of each solution evaluated in this second series is shown in TABLE 2, depicted as % solids of each anti-soiling polymer and stainblocking polymer added to the Bissell cleaning solution. Also included in TABLE 2 is a proprietary carpet cleaning solution available from Bissell (CS-2A) believed to be the CS-2 carpet cleaning solution containing a proprietary anti-soiler.

TABLE 2

| | Percent in CS-2: | | | | | | |
|---|---|---|---|---|---|---|---|
| Component: | CS-2 | CS-2A | CTS-D | CTS-E | CTS-F | CTS-G | CTS-H |
| Anti-soiling polymer: | (none) | | | | | | |
| Proprietary anti-soiler | | * | | | | | |
| Polymer A | | | 2.44 | 1.22 | 0.92 | 0.61 | 2.44 |
| Stainblocking polymer: | (none) | | | | | | |
| Polymer B | | | 2.44 | 1.22 | 1.63 | 1.96 | |
| FC-661 | | | | | | | 2.44 |

* Nature and amount of anti-soiler in formulation unknown

The third cleaning/treating solution, CTS-I, was based on another commercially available carpet cleaning solution (CS-3), BISSELL™ Fiber Cleansing Formula (Multi-Allergen Removal) Carpet Detergent (available from Bissell, Inc.), which is believed to contain proprietary hydrocarbon surfactants and sequestering agents. The composition of the solution evaluated is shown in TABLE 3, depicted as % solids of anti-soiling polymer and stainblocking polymer added to the Bissell cleaning solution.

TABLE 3

| | Percent in CS-3: | |
|---|---|---|
| Component: | CS-3 | CTS-I |
| Anti-soiling polymer: | (none) | |
| Polymer A | | 2.44 |
| Stainblocking polymer: | (none) | |
| Polymer B | | 2.44 |

The fourth cleaning/treating solution, CTS-J, was based on another commercially available carpet cleaning formulation (CS-4), P.C.A.™ Powered Cleaning Agent Formula 5, a carpet cleaner that is available from Bane-Clene Corp., Indianapolis, Ind. The composition of each solution evaluated in this fourth series is shown in TABLE 4, depicted as % solids of each anti-soiling and stainblocking polymer in the Bane-Clene cleaner.

TABLE 4

| | Percent in CS-4: | |
|---|---|---|
| Component | CS-4 | CTS-J |
| Anti-soiling polymer: | (none) | |
| Polymer A | | 2.44 |
| Stainblocking polymer: | (none) | |
| Polymer B | | 2.44 |

Carpet Test Samples

Five different carpet test samples, Carpet 1, Carpet 2, Carpet 3, Carpet 4 and Carpet 5, were prepared for evaluation of the cleaning/treating solution candidates. Four carpets were treated and one was untreated prior to cleaning/treating—as described below.

Carpet 1—TRANSITION™ III nylon 6,6 carpet treated with FC-661 stainblocking polymer at 0.5% SOF and Polymer A antisoiling polymer at 0.1% SOF using the Simulated Flex-Nip Application Procedure. The aqueous treating solution also contained 2.78% of a 10% aqueous solution of $MgSO_4$, with pH adjusted to 1.94 using a 10% aqueous solution of sulfamic acid.

Carpet 2—TRANSITION™ III nylon 6,6 carpet treated with SR-500 stainblocking polymer at 0.5% SOF and Polymer A antisoiling polymer at 0.1% SOF using the Simulated Flex-Nip Application Procedure. The pH of the aqueous treating was adjusted to 1.94 using a 10% aqueous solution of sulfamic acid.

Carpet 3—TRANSITION™ III nylon 6,6 carpet treated with FC-661 stainblocking polymer at 0.5% SOF, Polymer A antisoiling polymer at 0.075% SOF and PM-1661 carpet protector at 0.025% SOF using the Simulated Flex-Nip Application Procedure. The aqueous treating solution also contained 2.78% of a 10% aqueous solution of $MgSO_4$, with pH adjusted to 1.94 using a 10% aqueous solution of sulfamic acid.

Carpet 4—Untreated TRANSITION™ III nylon 6,6 carpet.

Carpet 5—QUEEN™ nylon 6,6 carpet treated with FC-661 stainblocking polymer at 0.5% SOF and Polymer A antisoiling polymer at 0.1% SOF using the Simulated Flex-Nip Application Procedure. The aqueous treating solution also contained 2.78% of a 10% aqueous solution of $MgSO_4$, with pH adjusted to 1.94 using a 10% aqueous solution of sulfamic acid.

Examples 1–10 and Comparative Examples C1–C10

In this evaluation series, CTS-A, CTS-B and CTS-C, laboratory-formulated cleaning/treating solutions of this invention were compared to laboratory-formulated carpet cleaning solution CS-1 in their ability to render treated nylon 6,6 carpets more resistant to walk-on soiling and staining after cleaning (see TABLE 1 for formulations of the solutions).

The carpets to be cleaned in this test series were TRANSITION™ III nylon 6,6 carpets that had been treated as follows:

Carpet 1: FC-661 stainblocking polymer at 0.5% SOF, Polymer A anti-soiling polymer at 0.1% SOF Carpet 2: SR-500 stainblocking polymer at 0.5% SOF, Polymer A anti-soiling polymer at 0.1% SOF Carpet 3: FC-661 stainblocking polymer at 0.5% SOF, Polymer A anti-soiling polymer at 0.075% SOF, PM-1661 carpet protector at 0.025% SOF Carpet 4: Untreated TRANSITION™ III carpet Using the Carpet Cleaning Procedure, the number of cleaning/extraction cycles was varied between zero and two. For Example 3 and Comparative Example C4, the clean/extracted carpet samples were re-treated with a combination of FC-661 stainblocking polymer and Polymer A anti-soiling polymer using the Spray Re-treatment Procedure. After cleaning/extraction and optional re-treating, all carpet samples were evaluated for soil resistance using the "Walk-On Soiling Test" and for stain resistance using the Stain Resistance Test. For Comparative Examples C1, C5, C7 and C10, the carpet was evaluated in its original condition, i.e., the carpet was not cleaned prior to evaluation.

Results, presented in TABLE 5, represent the combination of two test series; results from the first series are followed with a superscript 1, while results from the second test series are followed with a superscript 2.

TABLE 5

| Ex. | Carpet | Clean/ Treat Solution | # Cleaning/ Extr. Cycles | Spray Re-treat. ? | Walk-On Soiling, ΔE | Stain Resistance, Δa |
|---|---|---|---|---|---|---|
| C1 | 1 | None | 0 | No | 3.8[1], 3.7[2] | 2.4[1], 3.3[2] |
| C2 | 1 | CS-1 | 1 | No | 8.1[1], 5.7[2] | 26.4[1], 12.6[2] |
| C3 | 1 | CS-1 | 2 | No | 8.1[1], 5.8[2] | 29.2[1], 32.4[2] |
| C4 | 1 | CS-1 | 2 | Yes | 4.4[1] | 3.9[1] |
| 1 | 1 | CTS-A | 1 | No | 6.9[1] | 2.6[1] |
| 2 | 1 | CTS-A | 2 | No | 7.1[1] | 4.8[1] |
| 3 | 1 | CTS-A | 2 | Yes | 2.9[1] | 1.2[1] |
| 4 | 1 | CTS-B | 1 | No | 4.6[2] | 4.0[2] |
| 5 | 1 | CTS-B | 2 | No | 4.7[2] | 7.0[2] |
| C5 | 2 | None | 0 | No | 5.9[1] | 4.2[1] |
| C6 | 2 | CS-1 | 2 | No | 7.5[1] | 23.6[1] |
| 6 | 2 | CTS-A | 2 | No | 7.6[1] | 4.0[1] |
| 7 | 2 | CTS-C | 2 | No | 6.2[1] | 14.9[1] |
| C7 | 3 | None | 0 | No | 4.1[2] | 1.3[2] |
| C8 | 3 | CS-1 | 1 | No | 5.5[2] | 11.6[2] |
| C9 | 3 | CS-1 | 2 | No | 6.1[2] | 30.3[2] |
| 8 | 3 | CTS-B | 1 | No | 5.3[2] | 3.5[2] |
| 9 | 3 | CTS-B | 2 | No | 5.3[2] | 5.6[2] |
| C10 | 4 | None | 0 | No | 9.5[1], 6.7[2] | 37.7[1], 36.8[2] |
| 10 | 4 | CTS-A | 1 | No | 6.4[1] | 31.1[1] |

The data in TABLE 5 illustrate the advantage of this invention. For all carpet samples, those cleaned with cleaning/treating solutions, i.e., those cleaning solutions additionally containing a combination of antisoiling polymer (Polymer A) and stainblocking polymer (Polymer B, FC-661 or SR-500) (i.e., CTS-A, CTS-B or CTS-C) exhibited improved soiling and stain resistance when compared to the same carpet samples cleaned with the same cleaning solution without these polymers (CS-1). This improved resistance to soiling and staining was most pronounced with treated carpet samples (Carpets 1, 2 and 3), but cleaning of the untreated carpet sample (Carpet 4) with cleaning/treating solution CTS-A also imparted some soil and stain resistance. Spray treatment of combinations of anti-soiling polymers and stainblocking polymers to carpet samples previously cleaned with either a cleaning/treating solution of this invention or a known cleaning solution further improved soil and stain resistance. Comparing the results from Example 2 vs. Example 3 illustrates the benefit in using a spray application of Polymer A and FC-661 as an additional step after cleaning.

It is very surprising to see the high anti-soiling and improved stainblocking performance imparted by treatments of this invention following such an extremely short contact time between polymers and carpet samples, as vacuum extraction is performed almost immediately applied after contact of the cleaning/treating solution.

Examples 11–15 and Comparative Examples C1, C7 and C11–C14

In this evaluation series, CTS-D and CTS-H cleaning/treating solutions, formulated from BISSELL™ Fiber Cleansing Formula Carpet Detergent (CS-E), were compared to CS-2 cleaning solution in their ability to render treated nylon 6,6 carpets more resistant to walk-on soiling and staining after cleaning (see TABLE 2 for formulations of the solutions).

The carpets to be cleaned in this test series were TRANSITION™ III nylon 6,6 carpets that had been treated as follows:

Carpet 1: FC-661 stainblocking polymer at 0.5% SOF, Polymer A anti-soiling polymer at 0.1% SOF Carpet 2: SR-500 stainblocking polymer at 0.5% SOF, Polymer A anti-soiling polymer at 0.1% SOF Carpet 3: FC-661 stainblocking polymer at 0.5% SOF, Polymer A anti-soiling polymer at 0.075% SOF, PM-1661 carpet protector at 0.025% SOF Using the Carpet Cleaning Procedure, the number of cleaning/extraction cycles was varied between zero and two. After cleaning/extraction, all carpet samples were evaluated for soil resistance using the "Walk-On Soiling Test" and for stain resistance using the Stain Resistance Test. For Comparative Examples C1, C5 and C7, the carpet was evaluated in its original condition, i.e., the carpet was not cleaned prior to evaluation.

Results, presented in TABLE 6, represent the combination of two test series; results from the first series are followed with a superscript 1, while results from the second test series are followed with a superscript 2.

TABLE 6

| Ex. | Carpet | Clean/ Treat Solution | # Cleaning/ Extr. Cycles | Walk-On Soiling, ΔE | Stain Resistance, Δa |
|---|---|---|---|---|---|
| C1 | 1 | None | 0 | 3.8[1] | 2.4[1] |
| C11 | 1 | CS-2 | 1 | 9.0[1] | 9.5[1] |
| C12 | 1 | CS-2 | 2 | 9.3[1] | 16.4[1] |
| 11 | 1 | CTS-D | 1 | 4.7[1] | 5.1[1] |
| 12 | 1 | CTS-D | 2 | 4.4[1] | 2.4[1] |
| C5 | 2 | None | 0 | 5.9[1] | 4.2[1] |
| 13 | 2 | CTS-D | 2 | 3.7[1] | 5.1[1] |
| C7 | 3 | None | 0 | 4.1[2] | 1.3[2] |
| C13 | 3 | CS-2 | 1 | 5.9[2] | 3.9[2] |
| C14 | 3 | CS-2 | 2 | 5.9[2] | 8.0[2] |

TABLE 6-continued

| Ex. | Carpet | Clean/ Treat Solution | # Cleaning/ Extr. Cycles | Walk-On Soiling, ΔE | Stain Resistance, Δa |
|---|---|---|---|---|---|
| 14 | 3 | CTS-H | 1 | 4.3[2] | 5.3[2] |
| 15 | 3 | CTS-H | 2 | 4.1[2] | 3.5[2] |

The data in TABLE 6 further illustrate the advantage of this invention. For all carpet samples, those cleaned with cleaning/treating solutions, i.e., those cleaning solutions containing a combination of antisoiling polymer and stainblocking polymer (i.e., CTS-D and CTS-H) exhibited improved soiling and stain resistance when compared to the same carpet samples cleaned with the same cleaning solution without these polymers (CS-2).

Examples 16–17 and Comparative Examples C7 and C15–C16

In this evaluation series, CTS-I cleaning/treating solution, formulated from BISSELL™ Fiber Cleansing Formula (Multi-Allergen Removal) Carpet Detergent (CS-3), was compared to CS-3 cleaning solution in its ability to render treated TRANSITION™ nylon 6,6 carpet (i.e., Carpet 3) samples more resistant to walk-on soiling and staining after cleaning. (See TABLE 3 for formulations of the solutions.)

Using the Carpet Cleaning Procedure, the number of cleaning/extraction cycles was varied between zero and two. After cleaning/extraction, all carpet samples were evaluated for soil resistance using the "Walk-On Soiling Test" and for stain resistance using the Stain Resistance Test. For Comparative Example C7, the carpet was evaluated in its original condition, i.e., the carpet was not cleaned prior to evaluation.

Results, presented in TABLE 7, represent the second of the two test series so are followed with a superscript 2.

TABLE 7

| Ex. | Carpet | Clean/ Treat Solution | # Cleaning/ Extr. Cycles | Walk-On Soiling, ΔE | Stain Resistance, Δa |
|---|---|---|---|---|---|
| C7 | 3 | None | 0 | 4.1[2] | 1.3[2] |
| C15 | 3 | CS-3 | 1 | 5.2[2] | 19.5[2] |
| C16 | 3 | CS-3 | 2 | 5.4[2] | 27.2[2] |
| 16 | 3 | CTS-I | 1 | 4.3[2] | 5.3[2] |
| 17 | 3 | CTS-I | 2 | 4.1[2] | 3.5[2] |

The data in TABLE 7 again illustrate the advantage of this invention, showing that cleaning/treating solution CTS-I outperformed cleaning solution CS-3 in imparting soil and stain resistance to the cleaned carpet.

Example 18 and Comparative Examples C1 and C17

In this evaluation series, CTS-J cleaning/treating solution, formulated from P.C.A.™ Powered Cleaning Agent Formula 5 (CS-4), was compared to CS-4 cleaning solution in its ability to render treated TRANSITION™ III nylon 6,6 carpet (i.e., Carpet 1) samples more resistant to walk-on soiling and staining after cleaning. (See TABLE 4 for formulations of the solutions.)

Using the Carpet Cleaning Procedure, the number of cleaning/extraction cycles was either zero or three. After cleaning/extraction, all carpet samples were evaluated for soil resistance using the "Walk-On Soiling Test" and for stain resistance using the Stain Resistance Test. For Comparative Example C1, the carpet was evaluated in its original condition, i.e., the carpet was not cleaned prior to evaluation.

Results, presented in TABLE 8, represent the first of the two test series so are followed with a superscript 1.

TABLE 8

| Ex. | Carpet | Clean/ Treat Solution | # Cleaning/ Extr. Cycles | Walk-On Soiling, ΔE | Stain Resistance, Δa |
|---|---|---|---|---|---|
| C1 | 1 | None | 0 | $3.8^1$ | $2.4^1$ |
| C17 | 1 | CS-4 | 3 | $6.2^1$ | $26.8^1$ |
| 18 | 1 | CTS-J | 3 | $4.9^1$ | $3.9^1$ |

The data in TABLE 8 again illustrate the advantage of this invention, showing that cleaning/treating solution CTS-J outperformed cleaning solution CS-4 in imparting soil and stain resistance to the cleaned carpet.

Example 19–21 and Comparative Example C18–C19

In Examples 19–21, BISSELL™ Fiber Cleansing Formula Carpet Detergent (CS-2) containing Polymer A anti-soiling polymer and Polymer B stainblocking polymer at varying weight ratios (approximately 4:4, 3:5 and 2:6 for CST-E, CST-F and CST-G, respectively) but at approximately the same total solids level was used to clean/treat Carpet 5 (i.e., QUEEN™ nylon 6,6 carpet) samples using the Carpet Cleaning Procedure and employing two cleaning/extraction cycles. (See TABLE 2 for formulations of the cleaning/treating solutions.) After cleaning/extraction, all carpet samples were evaluated for soil resistance using the "Walk-On Soiling Test" and for stain resistance using the Stain Resistance Test.

In Comparative Example C18, the same procedure was followed as in Examples 19–21 except that CS-2A carpet detergent was used (i.e., CS-2 detergent containing a proprietary anti-soiler).

In Comparative Example C19, the carpet was not cleaned and/or cleaned/treated prior to the soil resistance and stain resistance evaluations.

Results from this study are presented in TABLE 9.

TABLE 9

| Ex. | Carpet | Clean/ Treat Solution | % solids in CS-E: Polymer A | Polymer B | Total (ratio) | Walk-On Soiling, ΔE | Stain Resistance, Δa |
|---|---|---|---|---|---|---|---|
| 19 | 5 | CTS-E | 1.22 | 1.22 | 2.44 (4:4) | 8.91 | 0.75 |
| 20 | 5 | CTS-F | 0.92 | 1.63 | 2.55 (3:5) | 8.79 | 0.85 |
| 21 | 5 | CTS-G | 0.61 | 1.96 | 2.57 (2:6) | 8.95 | 0.57 |
| C18 | 5 | CS-2A | — | — | — | 13.06 | 4.85 |
| C19 | 5 | — | — | — | — | 4.48 | −1.13 |

The data in TABLE 9 show that the carpet detergent containing 4:4, 3:5 and 2:6 ratios of Polymer A to Polymer B all performed comparably in imparting both soil resistance and stain resistance to the carpet. This indicates that good performance was achieved using a wide variety of component ratios in the detergent, so that performance was fairly insensitive to component ratio. All three cleaning/treating compositions of this invention outperformed the carpet detergent containing the proprietary anti-soiler and approached the performance exhibited by the carpet that was not cleaned before testing.

We claim:

1. A composition comprising a stainblocker, silsesquioxane, and surfactant; wherein said composition is an aqueous composition having a pH of at least 6 and wherein the stainblocker is selected from (a) a polymer derived from at least one or more alpha- and/or beta-substituted acrylic acid monomers of the formula $HR^1$ C═C(R)COOX, where $R^1$ is hydrogen, R is an alkyl group having 1 to 4 carbon atoms, phenyl, phenol, sulfonated phenol, naphthol, chlorine, or fluorine, and X is hydrogen, sodium, potassium or ammonium;

(b) a sulfonated aromatic (co)polymer; and (c) hydrolyzed copolymers of maleic anhydride and at least one ethylenically unsaturated monomer.

2. The composition of claim 1, wherein the alpha- and/or beta-substituted acrylic acid monomers are polymethacrylic acid, copolymers of methacrylic acid and one or more other monomers that are copolymerizable with methacrylic acid, and blends of polymethacrylic acid and methacrylic acid copolymer.

3. The composition of claim 1, wherein the silsesquioxane comprises compounds of the formula $R—Si(OR')_3$ wherein R is a substituted or unsubstituted hydrocarbon radical having 1 to 7 carbon atoms, and R' is an alkyl radical with 1 to 4 carbon atoms.

4. The composition of claim 3, wherein the silsesquioxane comprises compounds of the formula $R—Si(OR')_3$ wherein R is an unsubstituted hydrocarbon radical having 1 to 7 carbon atoms, and R' is an alkyl radical with 1 to 4 carbon atoms.

5. The composition of claim 3, wherein the silsesquioxane comprises compounds of the formula $R—Si(OR')_3$ wherein R and R' are $—CH_3$.

6. The composition of claim 1, wherein the silsesquioxane comprises cocondensates of $R—Si(OR')_3$ and silanes selected from $Si(OR')_4$ and $R_2—Si(OR')_2$, or combinations thereof, wherein R is an unsubstituted hydrocarbon radical having 1 to 7 carbon atoms, and R' is an alkyl radical with 1 to 4 carbon atoms.

7. The composition of claim 1, wherein the pH is from 6 to 8.

8. The composition of claim 1, wherein said stainblocker comprises a polymer derived from polymethacrylic acid, copolymers of methacrylic acid and one or more other monomers that are copolymerizable with methacrylic acid, and blends of polymethacrylic acid and methacrylic acid copolymer;

said silsesquioxane comprises compounds of the formula R—$Si(OR')_3$ wherein R is a substituted or unsubstituted hydrocarbon radical having 1 to 7 carbon atoms, and R' is an alkyl radical with 1 to 4 carbon atoms;

said surfactant is sodium xylene sulfonate, sodium lauryl sulfate, sodium myristyl sulfate, sodium lauryl ether (2) sulfate, sodium decyl sulfate, ammonium myristyl ether sulfate, sodium nonylphenol polyglycol ether (15) sulfate, sodium $C_{16}$–$C_{18}$ α-olefin sulfonate, sodium dodecylbenzenesulfonate, sodium naphthyl sulfonate, sodium dihexyl sulfosuccinate, sodium laurate, sodium stearate, sodium ether (5) stearate, potassium ricinoleate, sodium myristoyl sarcosine, sodium N-methyl-N-oleyl taurate, nonylphenol polyethylene glycol ether or combinations thereof; and said pH is from 6 to 8.

9. The composition of claim 1, wherein the composition comprises:

(a) 1 to 4 weight percent of a stainblocker;

(b) 1 to 4 weight percent silsesquioxane; and (c) 1 to 4 weight percent surfactant.

10. The composition of claim 1 further comprising a sequestering agent, salt, or combination thereof.

11. A method of cleaning a fibrous substrate while imparting soil and stain resistance properties, comprising the steps of:

(a) water extracting the substrate with the composition of claim 1; and (b) vacuum removal of the composition from the substrate.

12. The method of claim 11, wherein the stainblocker comprises a polymer derived from at least one or more alpha- and/or beta-substituted acrylic acid monomers.

13. The method of claim 12, wherein the alpha- and/or beta-substituted acrylic acid monomers are polymethacrylic acid, copolymers of methacrylic acid and one or more other monomers that are copolymerizable with methacrylic acid, and blends of polymethacrylic acid and methacrylic acid copolymer.

14. The method of claim 11, wherein the silsesquioxane comprises compounds of the formula R—$Si(OR')_3$ wherein R is a substituted or unsubstituted hydrocarbon radical having 1 to 7 carbon atoms, and R' is an alkyl radical with 1 to 4 carbon atoms.

15. The method of claim 11, wherein the silsesquioxane comprises cocondensates of R—$Si(OR')_3$ and silanes selected from $Si(OR')_4$ and $R_2$—$Si(OR')_2$, or combinations thereof, wherein R is an unsubstituted hydrocarbon radical having 1 to 7 carbon atoms, and R' is an alkyl radical with 1 to 4 carbon atoms.

16. The method of claim 11, wherein the composition has a pH within the range of 6 to 8.

17. The method of claim 11, wherein said stainblocker comprises a polymer derived from polymethacrylic acid, copolymers of methacrylic acid and one or more other monomers that are copolymerizable with methacrylic acid, and blends of polymethacrylic acid and methacrylic acid copolymer;

said silsesquioxane comprises compounds of the formula R—$Si(OR')_3$ wherein R is a substituted or unsubstituted hydrocarbon radical having 1 to 7 carbon atoms, and R' is an alkyl radical with 1 to 4 carbon atoms; and said surfactant is sodium xylene sulfonate, sodium lauryl sulfate, sodium myristyl sulfate, sodium lauryl ether sulfate, sodium decyl sulfate, ammonium myristyl ether sulfate, sodium nonylphenol polyglycol ether sulfate, sodium $C_{16}$–$C_{18}$ α-olefin sulfonate, sodium dodecylbenzenesulfonate, sodium naphthyl sulfonate, sodium dihexyl sulfosuccinate, sodium laurate, sodium stearate, sodium ether (5) stearate, potassium ricinoleate, sodium myristoyl sarcosine, sodium N-methyl-N-oleyl taurate, nonylphenol polyethylene glycol ether or combinations thereof; and said pH is from 6 to 8.

18. The method of claim 11, wherein the composition comprises:

(a) 1 to 4 weight percent of a stainblocker;

(b) 1 to 4 weight percent silsesquioxane; and (c) 1 to 4 weight percent surfactant.

19. The method of claim 11 further comprising a sequestering agent, salt, or combination thereof.

20. The method of claim 11, wherein the substrate is carpet.

* * * * *

UNITED STATES PATENT AND TRADEMARK OFFICE

CERTIFICATE OF CORRECTION

PATENT NO. : 6,802,870 B2
APPLICATION NO. : 10/726901
DATED : October 12, 2004
INVENTOR(S) : John C. Chang It is certified that error appears in the above-identified patent and that said Letters Patent is hereby corrected as shown below:

First Page, Column 2, item 56 References Cited
Under "U.S. Patent Documents", after line 5, insert the following:

| | | | |
|---|---|---|---|
| --US - | 1,901,536 | 03/1933 | Schäfer |
| US- | 1,972,754 | 09/1934 | Biedermann |
| US- | 1,988,985 | 01/1935 | Schäfer |
| US- | 2,112,361 | 03/1938 | Fischer |
| US- | 2,171,806 | 09/1939 | Russell et al. |
| US- | 3,493,424 | 02/1970 | Mohrlok et al. |
| US- | 4,351,736 | 09/1982 | Steinberger et al. |
| US- | 4,680,212 | 07/1987 | Blyth et al. |
| US- | 4,833,009 | 05/1989 | Marshall |
| US- | 4,833,839 | 05/1989 | Kurose |
| US- | 4,875,901 | 10/1989 | Payet et al. |
| US- | 4,937,123 | 06/1990 | Chang et al. |
| US- | 4,940,757 | 07/1990 | Moss, III et al. |
| US- | 4,963,409 | 10/1990 | Liss et al. |
| US- | 5,001,004 | 03/1991 | Fitzgerald et al. |
| US- | 5,061,763 | 10/1991 | Moss, III et al. |
| US- | 5,073,442 | 12/1991 | Knowlton et al. |
| US- | 5,074,883 | 12/1991 | Wang |
| US- | 5,098,774 | 03/1992 | Chang |
| US- | 5,212,272 | 05/1993 | Sargent et al. |
| US- | 5,310,828 | 05/1994 | Williams |
| US- | 5,460,887 | 10/1995 | Pechhold |
| US- | 6,225,403 | 05/2001 | Knowlton |

FOREIGN PATENT DOCUMENTS

| | | |
|---|---|---|
| PCT | WO 92/07131 | 04/1992 |
| DE | 30 04 824 | 08/1981 |
| PCT | WO 02/097188 | 12/2002 |

OTHER PUBLICATIONS

J. J. Bikerman, "*Foams*", Springer-Verlag, New York, Inc., pp. 108-132, (1973)

Encyclopedia of Chemical Technology, Kirk-Othmer, 3rd Ed., vol. 22, pp. 347-387, John Wiley & Sons (1983)

UNITED STATES PATENT AND TRADEMARK OFFICE

CERTIFICATE OF CORRECTION

PATENT NO. : 6,802,870 B2
APPLICATION NO. : 10/726901
DATED : October 12, 2004
INVENTOR(S) : John C. Chang It is certified that error appears in the above-identified patent and that said Letters Patent is hereby corrected as shown below:

Nonionic Surfactants: Physical Chemistry, "*Macroemulsions*" , Paul Becher and Marrtin J. Schick, vol. 23, Chapter 8, pp. 435-491, (1987)--

Signed and Sealed this

Fifteenth Day of May, 2007

JON W. DUDAS

*Director of the United States Patent and Trademark Office*